(12) United States Patent
Narusawa et al.

(10) Patent No.: US 6,762,894 B2
(45) Date of Patent: Jul. 13, 2004

(54) HEAD APPARATUS, HARD DISK APPARATUS AND RECORDING AND PLAYBACK APPARATUS

(75) Inventors: Keiji Narusawa, Kanagawa (JP); Norio Shoji, Kanagawa (JP)

(73) Assignee: Sony Corporation (JP)

( * ) Notice: Subject to any disclaimer, the term of this patent is extended or adjusted under 35 U.S.C. 154(b) by 260 days.

(21) Appl. No.: 09/892,999

(22) Filed: Jun. 28, 2001

(65) Prior Publication Data

US 2002/0001149 A1 Jan. 3, 2002

(30) Foreign Application Priority Data

Jun. 30, 2000 (JP) .................................... P2000-197909

(51) Int. Cl.[7] .............................................. G11B 5/09
(52) U.S. Cl. ........................ 360/46; 360/66; 360/67
(58) Field of Search ........................... 360/46, 234.4, 360/244.1, 66–68; G11B 5/02, 5/09

(56) References Cited

U.S. PATENT DOCUMENTS 6,219,722 B1 * 4/2001 Tomita ........................ 710/14
6,469,857 B1 * 10/2002 Miyake ........................ 360/67

* cited by examiner

Primary Examiner—David Hudspeth
Assistant Examiner—Dan I Davidson
(74) Attorney, Agent, or Firm—Rader, Fishman & Grauer PLLC; Ronald P. Kananen (57) ABSTRACT

A head apparatus which is tough against disturbing noise and superior in the S/N ratio and which can cope with an increase of the capacity of a recording medium is disclosed. A first playback amplifier for amplifying the playback signal of a MR head and a register circuit for setting the bias current to the MR head are formed as a COS IC. The COS IC is mounted on a suspension together with the MR head. A feeble playback signal outputted from the MR head is amplified by the first playback amplifier once and then transmitted to a mother IC over a pair of signal lines. The amplified playback signal is tough against disturbing noise during transmission.

12 Claims, 8 Drawing Sheets

HEAD APPARATUS, HARD DISK APPARATUS AND RECORDING AND PLAYBACK APPARATUS

BACKGROUND OF THE INVENTION

This invention relates to a head apparatus, a hard disk apparatus and a recording and playback apparatus, and more particularly to a head apparatus which includes a recording head for recording information onto a recording medium and a playback head for playing back the recorded information, and a hard disk apparatus and a recording and playback apparatus wherein the head apparatus is used to record and play back information onto and from a hard disk.

Figure 7:
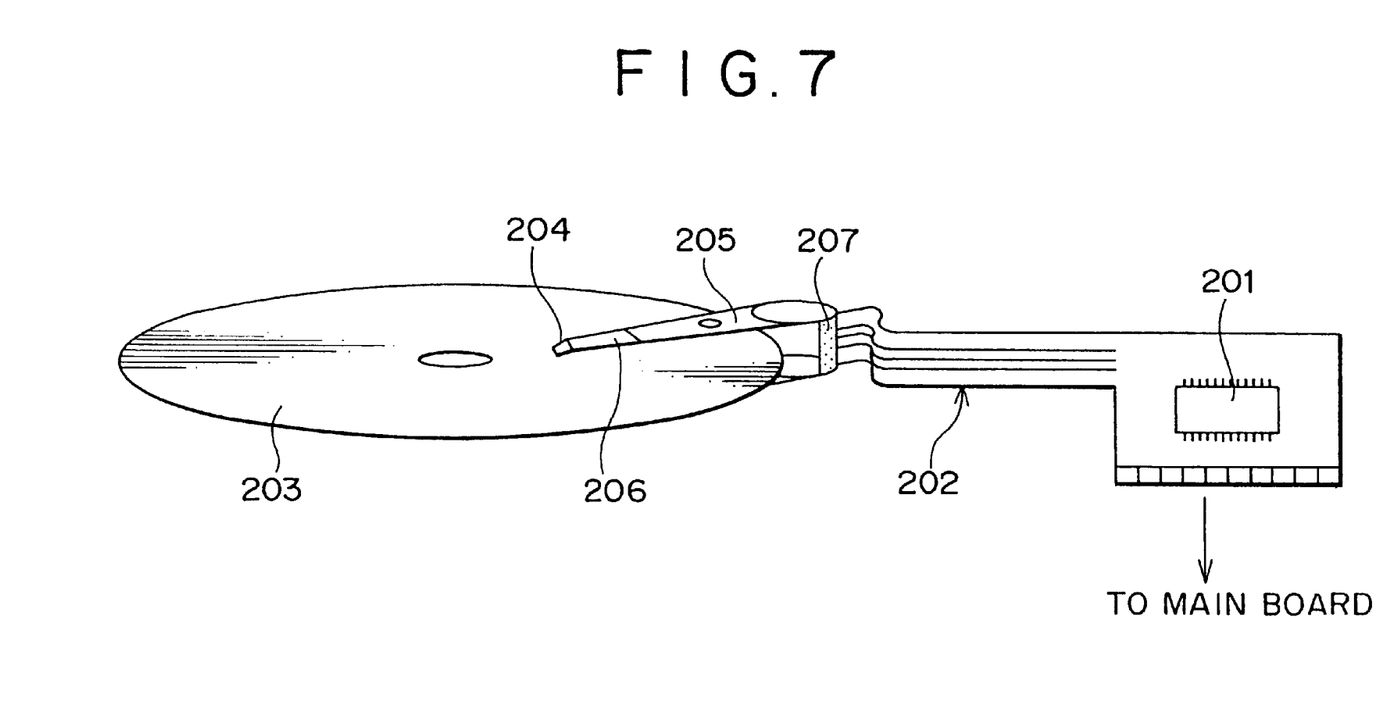
FIG. 7 is a schematic view showing an example of a configuration of a HDD apparatus.

A general configuration of a recording and playback apparatus for recording and playing back information onto and from a recording medium such as, for example, a hard disk drive (HDD) apparatus which uses a hard disk as a recording medium is shown in FIG. 7. A hard disk drive apparatus uses a magneto-resistive (MR) head (hereinafter referred to as MR head) as a playback head and uses an inductive head as a recording head. For example, a thin film (TF) head (hereinafter referred to as TF head) is known as the inductive head.

Referring to FIG. 7, a signal processing IC (read/write (R/W) IC) 201 having the functions of a playback amplifier and a recording driver is mounted on a flexible board 202, and a head section 204 for recording/playing back onto/from a recording medium such as, for example, a hard disk 203 is carried on a suspension 206 mounted at a free end of a head arm 205. The head section 204 is connected to the signal processing IC 201 by signal lines which extend through the suspension 206, the head arm 205, a head wiring line junction section 207 and the flexible board 202.

Figure 8:
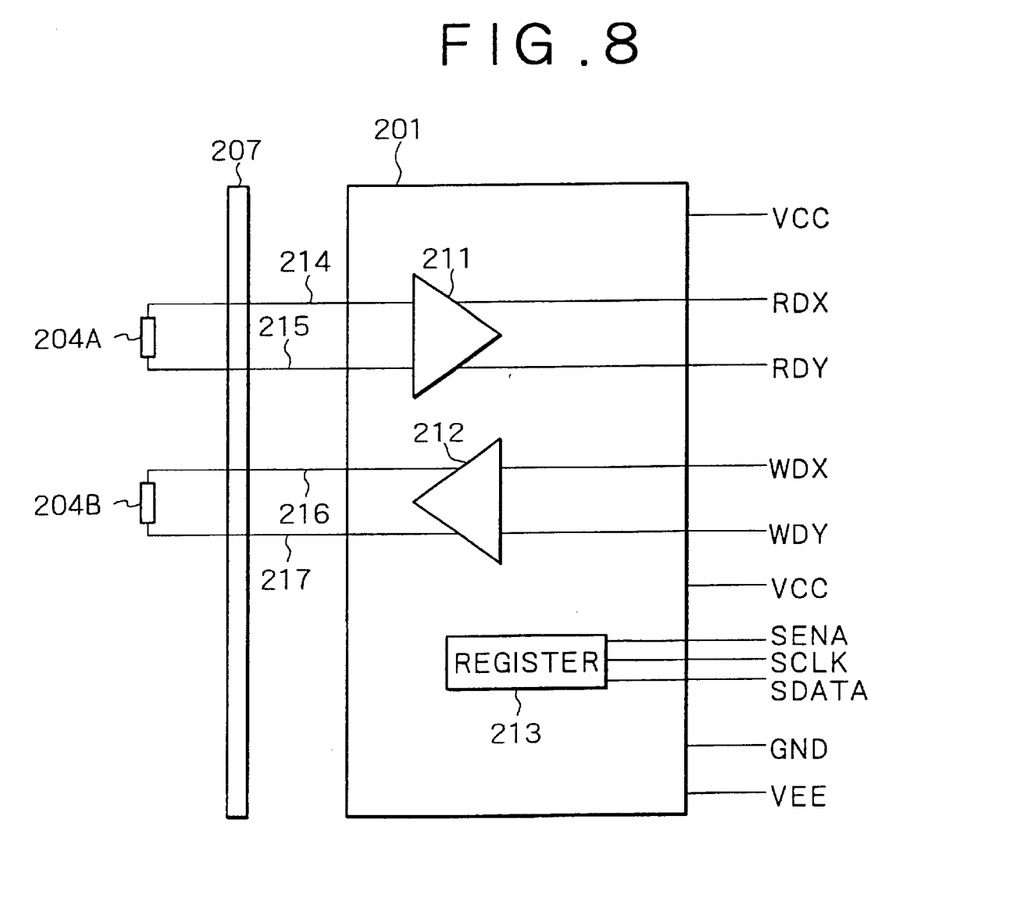
FIG. 8 is a block diagram showing an example of a conventional head apparatus.

FIG. 8 shows a basic configuration of the signal processing IC 201. Referring to FIG. 8, the signal processing IC 201 includes a playback amplifier 211, a recording driver 212 and a register circuit 213 built therein. The playback amplifier 211 is connected to a playback head such as, for example, an MR head 204A through the head wiring line junction section 207 by two signal lines 214 and 215, while the recording driver 212 is connected to a recording head such as, for example, a TF head 204B through the head wiring line junction section 207 by two signal lines 216 and 217.

A serial enable signal SENA, a serial clock signal SCLK and a serial data signal SDATA are inputted to the register circuit 213. The register circuit 213 controls a bias current to the MR head section 204A, a recording current to the TF head 204B and so forth based on information given thereto with the serial data signal SDATA.

In recent years, the storage capacity of the HDD apparatus has increased suddenly, and also the data rate has increased in proportion to the increase of the storage capacity. Since a rise of the data rate raises the frequency band, an improvement of the S/N ratio is required inevitably.

However, while in the head apparatus for a HDD apparatus, normally a playback signal of several mv is transmitted from the MR head 204A to the signal processing IC 201, since the transmission line from the MR head 204A to the signal processing IC 201 extends very long as can be seen from the foregoing description, the playback signal is liable to be influenced by disturbing noise. This causes a factor of deterioration of the S/N ratio.

Meanwhile, in the recording system, the sum of the inductance of the TF head 204B and the inductance of the board on the transmission line serves as a load to the recording driver 212. Thus, if the length of the transmission line from the signal processing IC 201 to the TF head 204B is long, since the load to the recording driver 212 increases in accordance with the length of the transmission line, when the data rate rises as the storage capacity increases, the recording speed cannot follow up the data rate.

SUMMARY OF THE INVENTION

It is an object of the present invention to provide a head apparatus, which is tough against disturbing noise and superior in the S/N ratio, and which can cope with an increase of the capacity of a recording medium and a hard disk apparatus and a recording and playback apparatus, which employ the head apparatus.

In order to attain the object described above, according to an aspect of the present invention, there is provided a head apparatus comprising a support section for supporting a head section, a playback amplifier mounted on the support section for amplifying a playback signal outputted from the head section, a circuit section mounted on the support section for setting a bias current for the head section, a signal processing system provided outside the support section, and a transmission line for transmitting read data outputted from the playback amplifier to the signal processing system and transmitting serial data from the signal processing system to the circuit section.

According to another aspect of the present invention, there is provided a hard disk apparatus, comprising a hard disk, and a head apparatus including a head section for recording and playing back information onto and from the hard disk, the head apparatus further including a support section for supporting the head section, a playback amplifier mounted on the support section for amplifying a playback signal outputted from the head section, a circuit section mounted on the support section for setting a bias current for the head section, a signal processing system provided outside the support section, and a transmission line for transmitting read data outputted from the playback amplifier to the signal processing system and transmitting serial data from the signal processing system to the circuit section.

According to a further aspect of the present invention, there is provided a recording and playback apparatus, comprising a head apparatus including a head section for recording and playing back information onto and from a recording medium, the head apparatus further including a support section for supporting the head section, a playback amplifier mounted on the support section for amplifying a playback signal outputted from the head section, a circuit section mounted on the support section for setting a bias current for the head section, a signal processing system provided outside the support section, and a transmission line for transmitting read data outputted from the playback amplifier to the signal processing system and transmitting serial data from the signal processing system to the circuit section.

In the head apparatus, hard disk apparatus and recording and playback apparatus, since the playback amplifier and the circuit section are mounted together with the head section on the support section for the head section, a feeble playback signal outputted from the head section is amplified by the playback amplifier once and then transmitted to the signal processing system by the transmission line. This increases the relative level difference between the signal level of the playback signal being transmitted and the noise level of disturbing noise. As a result, the playback signal becomes tough against disturbing noise and the S/N ratio of the playback signal can be improved.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

First Embodiment

Figure 1:
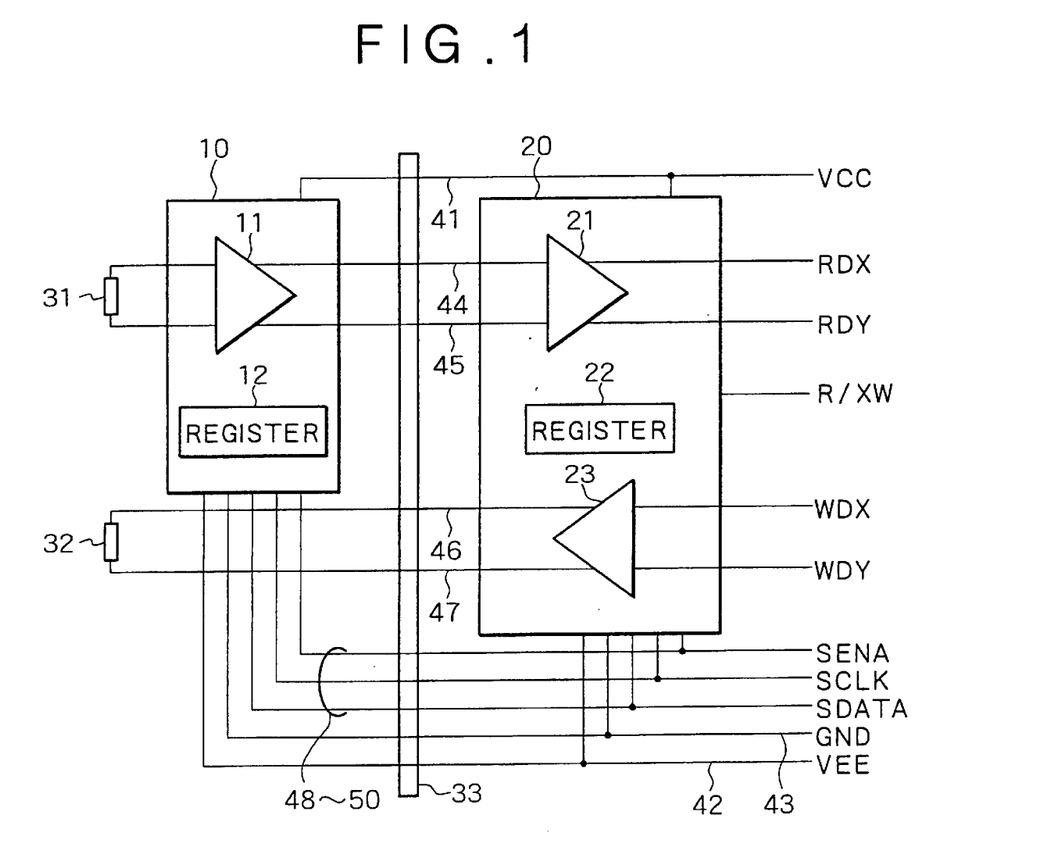
FIG. 1 is a block diagram showing a configuration of an electric system of a head apparatus to which the present invention is applied.

FIG. 1 shows a configuration of an electric system of a head apparatus according to a first embodiment of the present invention. The head apparatus according to the first embodiment adopts a configuration (hereinafter referred to as COS (chip on suspension)) wherein a playback amplifier is mounted on a suspension (refer to FIG. 7) together with a playback head such as, for example, a MR head and a recording head such as, for example, a TF head.

Referring to FIG. 1, in the head apparatus according to the embodiment to which the COS technique is applied, a signal processing system includes two ICs of a COS IC 10 and a mother IC 20. The COS IC 10 has a first playback amplifier 11 and a register circuit (circuit section) 12 built therein. A MR head 31 is connected to the first playback amplifier 11.

The mother IC 20 has a second playback amplifier 21, a register circuit 22, and a recording driver 23 built therein. A positive power supply VCC, a negative power supply VEE, and the GND (ground) level are applied to the mother IC 20. A mode control signal R/XW, a serial enable signal SENA, a serial clock signal SCLK, a serial data signal SDATA, and recording data WDX and WDY are inputted to the mother IC 20. Read data RDX and RDY are outputted from the mother IC 20.

The COS IC 10, the TF head 32 and the mother IC 20 are connected by totaling ten wires through a head wiring line junction section 33. The ten wires include power supply lines 41 and 42 for the positive power supply VCC and the negative power supply VEE, respectively, a ground (GND) line 43, two signal lines 44 and 45 which connect the first playback amplifier 11 and the second playback amplifier 21 to each other, two signal lines 46 and 47 which connect the recording driver 23 and the TF head 32 to each other, and three signal lines 48 to 50 for transmitting the serial data SENA, SCLK, and SDATA respectively.

In the head apparatus according to the first embodiment having the configuration described above, the register circuit 12 in the COS IC 10 sets a bias current for the MR head 31 based on information of the serial data signal SDATA transmitted by the signal line 50. The MR head 31 for which the bias current is set reads out recorded information from a recording medium such as, for example, a hard disk (refer to FIG. 7).

A feeble playback signal of several mv is outputted from the MR head 31. The feeble playback signal is amplified by the first playback amplifier 11 and is outputted as the differential read data RDX and RDY. The read data RDX and RDY are transmitted to the mother IC 20 through the signal lines 44 and 45, respectively, and are further amplified by and outputted from the second playback amplifier 21.

The register circuit 22 in the mother IC 20 sets a recording current for the TF head 32 and so forth to the recording drive 23 based on information of the serial data signal SDATA inputted thereto. When differential write data WDX and WDY are inputted, the recording drive 23 converts the write data WDX and WDY into a recording current corresponding to them. The recording current is transmitted to the TF head 32 through the signal lines 46 and 47 and written onto the recording medium by the TF head 32.

As described above, in the head apparatus according to the first embodiment, the first playback amplifier 11 and the register circuit (circuit section) 12 are mounted on the suspension together with the MR head 31 and the TF head 32. Consequently, the feeble playback signal outputted from the MR head 31 is amplified by the first playback amplifier 11 once and is then transmitted to the mother IC 20 through the signal lines 44 and 45. As a result, a relative level difference is increased between the signal level of the read data RDX and RDY being transmitted and the noise level of disturbing noise, and, therefore, the read data RDX and RDY become tough against noise and the S/N ratio can be improved.

Besides, the MR head 31 is very weak against static electricity. In the first embodiment of the present invention, the configuration wherein the MR head 31 is not connected directly to the signal lines 44 and 45 but through the first playback amplifier 11 is adopted. Consequently, even if static electricity is generated on the signal lines 44 and 45, since the first playback amplifier 11 functions as a buffer which buffers the static electricity, the MR head 31 can be protected from the static electricity. In other words, the MR head 31 becomes tough against the static electricity, and as a result, the yield of the MR head 31 can be improved.

Modification to the First Embodiment

Figure 2:
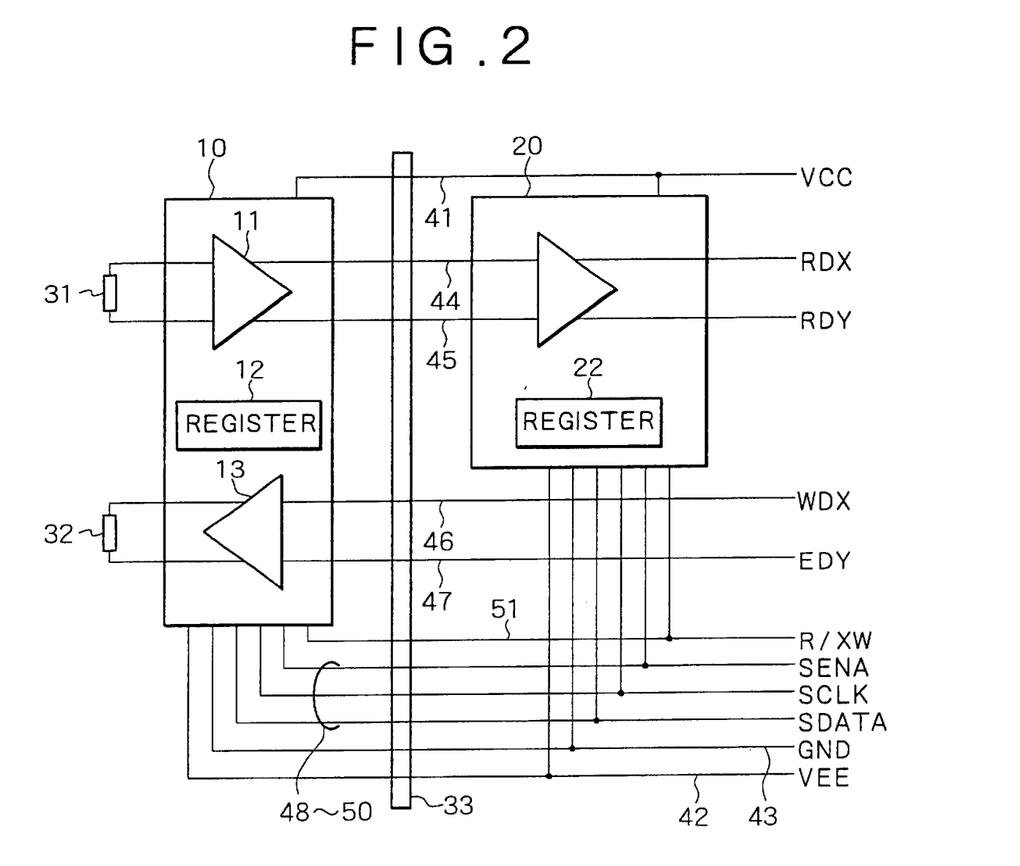
FIG. 2 is a similar view but showing a configuration of a modification to the electric system shown in FIG. 1.

FIG. 2 shows a configuration of an electric system of a head apparatus according to a modification to the first embodiment. The modified head apparatus adopts a configuration wherein not only a playback amplifier but also a recording driver are carried on a suspension together with a MR head and a TF head.

Referring to FIG. 2, the COS IC 10 has the recording driver 13 built therein together with the first playback amplifier 11 and the register circuit 12. Where the recording driver 13 is carried on the suspension, then the mode control signal R/XW is transmitted from the mother IC 20 to the COS IC 10 through the signal line 51. The register circuit 12 also performs a process for setting a recording current for the TF head 32 to the recording drive 13 based on information of the serial data signal SDATA inputted thereto.

Since the configuration wherein the recording driver 13 is mounted on the suspension together with the MR head 31 and the TF head 32 is adopted in this manner, the distance of the transmission line between the recording driver 13 and the TF head 32 becomes very short. As a result, the inductance of the transmission line decreases as much, and, therefore, the load to the recording driver 13 can be reduced. Consequently, even if the data rate is increased as the capacity of a recording medium is increased, the recording speed of the recording driver 13 can follow up it sufficiently.

Second Embodiment

Figure 3:
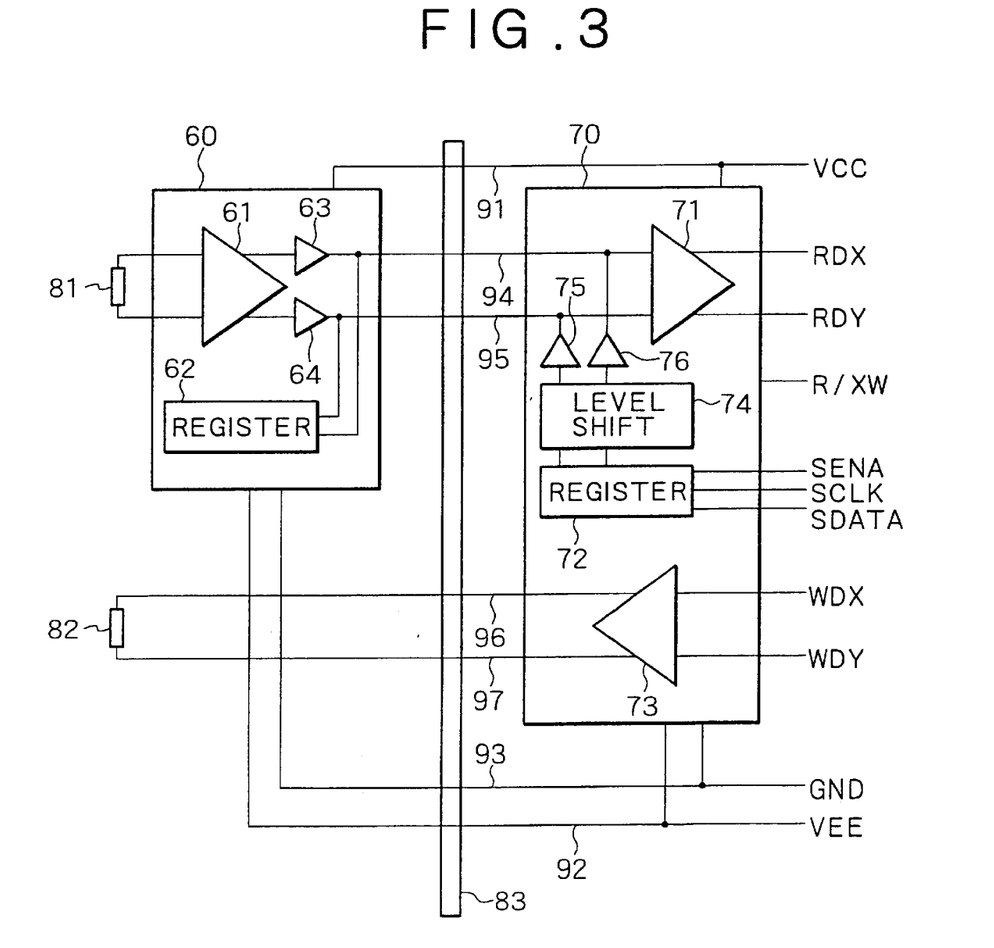
FIG. 3 is a similar view but showing a configuration of an electric system of another head apparatus to which the present invention is applied.

FIG. 3 shows a configuration of an electric system of a head apparatus according to a second embodiment of the present invention. In the head apparatus according to the second embodiment, the COS technique is used similarly to the head apparatus according to the first embodiment.

Referring to FIG. 3, a signal processing system of the head apparatus according to the second embodiment to which the COS technique is applied includes two ICs of a COS IC 60 and a mother IC 70. The COS IC 60 has a first playback amplifier 61, a register circuit 62, and buffers 63 and 64 built therein. An MR head 81 is connected to the first playback amplifier 61.

The mother IC 70 has a second playback amplifier 71, a register circuit 72, a recording driver 73, a level shift circuit 74, and buffers 75 and 76 built therein. A positive power supply VCC, a negative power supply VEE, and the GND level are applied to the mother IC 70. A mode control signal R/XW, a serial enable signal SENA, a serial clock signal SCLK, a serial data signal SDATA, and recording data WDX and WDY are inputted to the mother IC 70. Read data RDX and RDY are outputted from the mother IC 70.

The COS IC 60, the TF head 82 and the mother IC 70 are connected to each other by totaling seven lines through a head wiring line junction section 83. The seven wires include power supply lines 91 and 92 for the positive power supply VCC and the negative power supply VEE, respectively, a GND line 93, two signal lines 94 and 95 which connect the first playback amplifier 61 and the second playback amplifier 71 to each other, and two signal lines 96 and 97 which connect the recording driver 73 and the TF head 82 to each other.

The signal lines 94 and 95 which connect the first playback amplifier 61 and the second playback amplifier 71 to each other not only perform transmission of read data RDX and RDY, which are a playback signal, but also perform transmission of the serial enable signal SENA, the serial clock signal SCLK and the serial data signal SDATA.

Since the signal lines 94 and 95 for transmitting the read data RDX and RDY also are used for transmission of the serial data SENA, SCLK or SDATA in this manner, in the mother IC 70, the serial data SENA, SCLK or SDATA outputted through the register circuit 72 is applied to the signal lines 94 and 95 through the buffers 75 and 76 after the dc level thereof is shifted by, for example, the level shift circuit 74.

Meanwhile, in the COS IC 60, the serial data SENA, SCLK or SDATA transmitted by the signal lines 94 and 95 is inputted to the register circuit 62. Further, from the first playback amplifier 61, the read data RDX and RDY are outputted to the signal lines 94 and 95 through the buffers 63 and 64, respectively.

Figure 4:
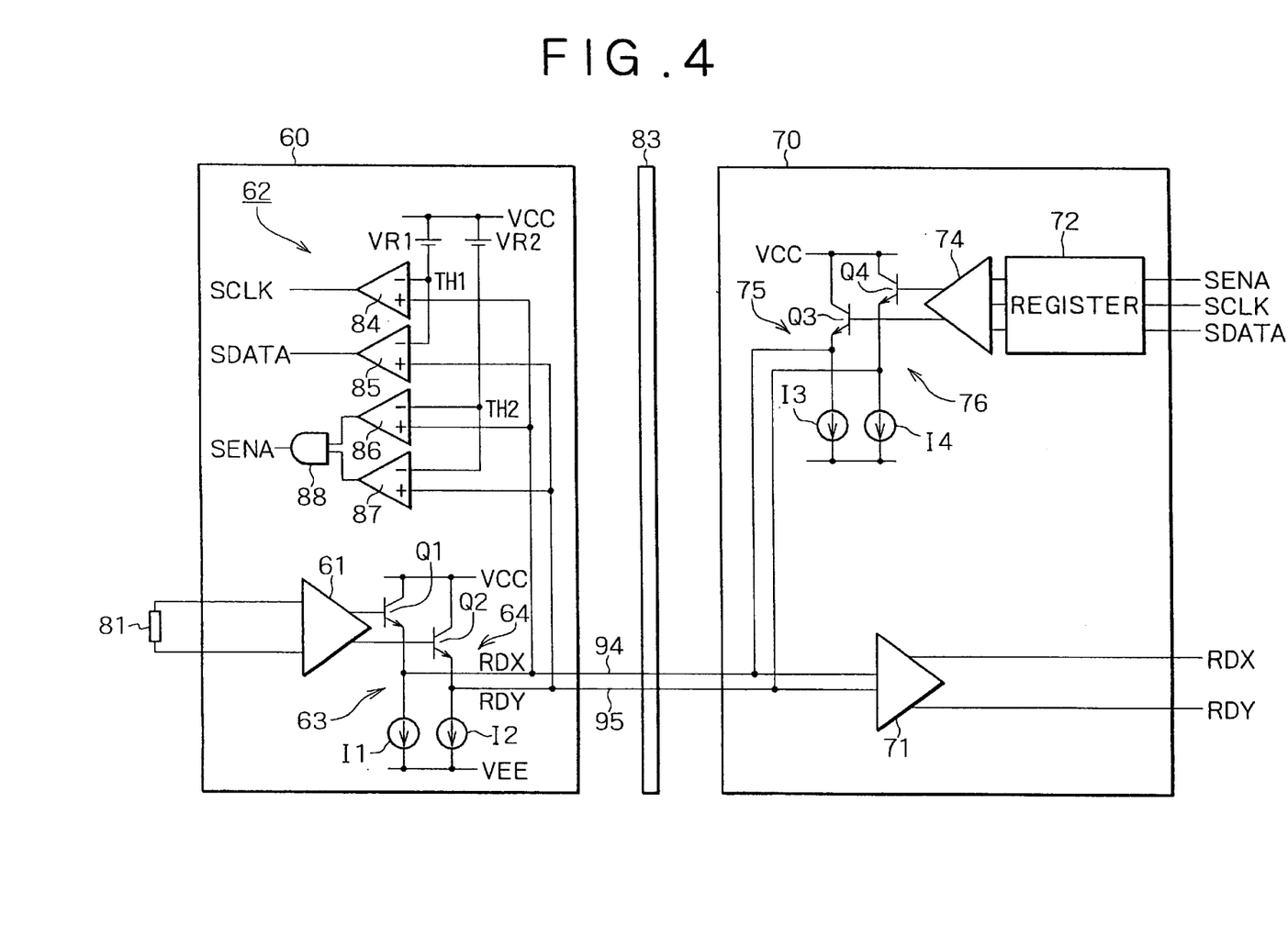
FIG. 4 is a circuit diagram showing an example of a detailed configuration of an internal circuit of a COS IC and a mother IC of the electric system of FIG. 3.

FIG. 4 shows an example of detailed internal configuration of the COS IC 60 and the mother IC 70.

Referring to FIG. 4, the buffer 63 in the COS IC 60 has an emitter follower configuration which includes a transistor Q1 and a current source I1 connected in series between the positive power supply VCC and the negative power supply VEE. Also, the buffer 64 has an emitter follower configuration which includes a transistor Q2 and a current source I2 connected in series between the positive power supply VCC and the negative power supply VEE. The signal lines 94 and 95 are connected each at one end thereof to the emitters of the transistors Q1 and Q2, respectively.

The register circuit 62 includes an identification circuit formed from four comparators 84, 85, 86 and 87 and an AND gate 88. Each of the comparators 84 and 85 in the register circuit 62 receives a threshold value TH1, which is lower by a predetermined voltage VR1 than the power supply voltage VCC, as an input to an inverted (−) input terminal thereof, and each of the comparators 86 and 87 receives another threshold value TH2, which is lower by another predetermined voltage VR2 than the power supply voltage VCC, as an input to an inverted input terminal thereof. Here, VR2>VR1.

Further, the signal level of the signal line 94 is inputted to a non-inverted (+) input terminal of each of the comparators 84 and 86, and the signal level of the signal line 95 is inputted to a non-inverted input terminal of each of the comparators 85 and 87. The AND gate 88 receives outputs of the comparators 86 and 87 at two input terminals thereof.

The threshold value TH1 is used as a reference value for identification of the serial clock signal SCLK and the serial data signal SDATA, and the threshold value TH2 serves as a reference value for identification of the serial enable signal SENA. In particular, when the signal level of the signal line 94 exceeds the threshold value TH1, the comparator 84 recognizes the transmission signal by the signal line 94 as the serial clock signal SCLK, and when the signal level of the signal line 95 exceeds the threshold value TH1, the comparator 85 recognizes the transmission signal by the signal line 95 as the serial data signal SDATA.

Further, when the signal level of the signal line 94 exceeds the threshold value TH2, the comparator 86 outputs a high level, and when the signal level of the signal line 95 exceeds the threshold value TH2, the comparator 87 outputs a high level. Consequently, when both of the signal levels of the signal lines 94 and 95 exceed the threshold value TH2, the AND gate 88 recognizes the transmission signal by the signal lines 94 and 95 as the serial enable signal SENA. The reason why the transmission signal by the signal lines 94 and 95 is recognized as the serial enable signal SENA when both of the signal levels of the signal lines 94 and 95 exceed the predetermined voltage VR2 in this manner is that it is intended to prevent an otherwise possible malfunction caused by noise.

Figure 5:
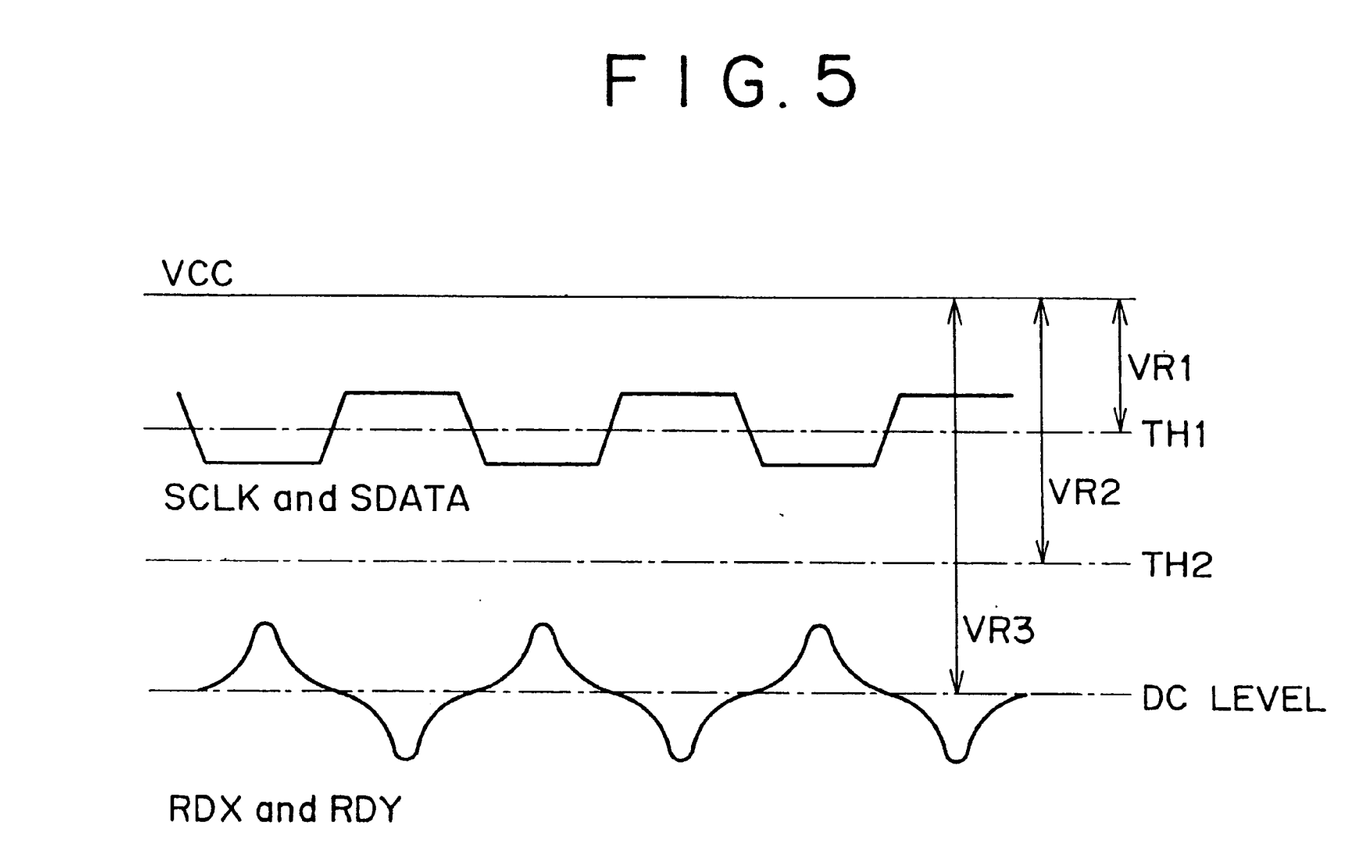
FIG. 5 is a level diagram illustrating a relationship in the level of dc voltages used in the electric system of FIG. 3.

Further, the read data RDX and RDY transmitted by the same signal lines 94 and 95 are identified from the serial data SENA, SCLK and SDATA by setting the dc level (a dc voltage VR3 from the power supply voltage VCC) of the read data RDX and RDY outputted from the first playback amplifier 61 to the potential relationship of VR3>VR2. FIG. 5 shows a level diagram of the voltages VR1, VR2 and VR3.

Meanwhile, in the mother IC 70, the level shift circuit 74 shifts the dc level of the serial clock signal SCLK and the serial data signal SDATA to a level lower by the predetermined dc voltage VR1 than the power supply voltage VCC as seen from the level diagram of FIG. 5 and supplies the serial clock signal SCLK and the serial data signal SDATA of the shifted level to the buffers 75 and 76. It is to be noted that the serial enable signal SENA is a signal represented by the levels (both higher than the threshold value TH2) of the serial clock signal SCLK and the serial data signal SDATA.

The buffer 75 has an emitter follower configuration composed of a transistor Q3 and a current source I3 connected in series between the positive power supply VCC and the negative power supply VEE (or the ground GND). Similarly, the buffer 76 has an emitter follower configuration composed of a transistor Q4 and a current source I4 connected in series between the positive power supply VCC and the negative power supply VEE (or the ground GND). The other ends of the signal lines 94 and 95 are connected to the emitters of the transistors Q3 and Q4, respectively.

Now, the circuit operation of the COS IC 60 and the mother IC 70 having the configuration described above is described.

Upon playback, usually, the register circuit 72 of the mother IC 70 is in an off-state and the transistors Q3 and Q4 of the buffers 75 and 76 also are in an off-state. Accordingly, the read data RDX and RDY read from a recording medium by the MR head 81 and played back by the first playback amplifier 61 are applied to the signal lines 94 and 95 through the transistors Q1 and Q2 of the buffers 63 and 64 and sent to the second playback amplifier 71 of the mother IC 70 by the signal lines 94 and 95, respectively. Then, the read data RDX and RDY are further amplified by and outputted from the second playback amplifier 71.

Upon serial data transfer, the register circuit 72 of the mother IC 70 is placed into an on state. It is to be noted that the transfer of serial data is performed not only during sleep but also upon playback.

The signal levels of the serial clock signal SCLK and the serial data signal SDATA vary around the threshold value TH1, as apparently seen from the level diagram of FIG. 5. Accordingly, the transistors Q1 and Q2 of the buffers 63 and 64 of the COS IC 60 exhibit a high impedance state because a reverse bias is applied between the emitter and the base.

Consequently, the serial data SENA, SCLK or SDATA is transmitted from the register circuit 72 of the mother IC 70 to the register circuit 62 of the COS IC 60 through the signal lines 94 and 95 without contention with the read data RDX and RDY. It is to be no ted that the identification among the serial data SENA, SCLK and SDATA is performed using the threshold values TH1 and TH2 as identification reference values by the register circuit 62 as described hereinabove.

As described above, when the head apparatus according to the second embodiment uses the COS technique wherein the first playback amplifier 61 is mounted on the suspension together with the MR head 81, it adopts the configuration wherein the signal lines 94 and 95 for transmitting the read data RDX and RDY from the COS IC 60 to the mother IC 70 are used also for transmission of the serial data SENA, SCLK and SDATA, and therefore, the number of connection wiring lines between the COS IC 60 and TF head 82 and the mother IC 70 can be reduced to seven while 10 such connection wiring lines are required in the head apparatus according to the first embodiment.

Consequently, if it is tried to accommodate the head apparatus into a thin housing, even if the small thickness of the housing provides a restriction to the size of the head wiring line junction section 83, that is, to the area for wiring lines, if the number of connection wiring lines is as small as 7 or so, then the wiring lines can be laid sufficiently in the allowable area. Further, even if the wiring operation at the head wiring line junction section 83 is, for example, soldering by a manual operation, the operation is facilitated as the number of connection wiring lines is reduced, and comparatively high workability can be anticipated.

It is to be noted that, while in the first and second embodiments described above, the playback amplifier and the register circuit are mounted on the suspension (refer to FIG. 7) and, in the modification to the first embodiment, the playback amplifier and the register circuit as well as the recording driver are mounted on the suspension, those elements need not be necessarily mounted on the suspension but may be mounted at any location of the support section of the head section, including the head arm (refer to FIG. 7).

Example of Application

The head apparatus according to the first embodiment, the head apparatus according to the modification to the first embodiment or the head apparatus according to the second embodiment can be used as a head apparatus including the head section in the HDD apparatus shown in FIG. 7. Further, it may be used as a head apparatus not only in an HDD apparatus but also in any other recording and playback apparatus which records and plays back information onto and from a recording medium.

An example of a configuration of a high density recording and playback apparatus which adopts, for example, a PRML (Partial Response Maximum Likelihood) system as one of such recording and playback apparatus as described above is shown in FIG. 6.

Figure 6:
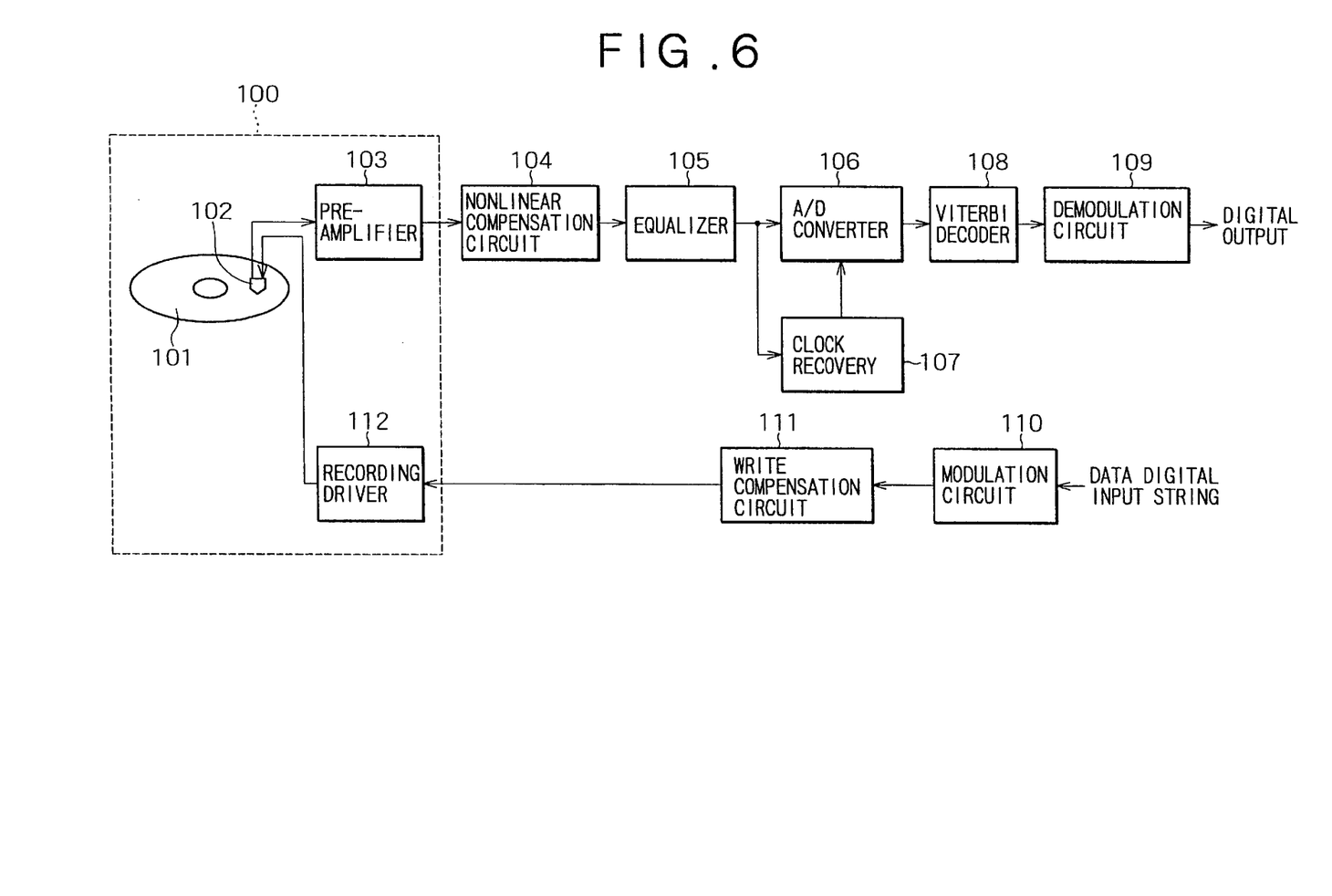
FIG. 6 is a block diagram showing an example of a configuration of a recording and playback apparatus to which the present invention is applied.

Referring to FIG. 6, recorded information of a disk-type recording medium 101 is read by a head section 102. A playback signal is outputted from the head section 102 and supplied to a nonlinear compensation circuit 104 through a preamplifier 103. The playback signal is nonlinearly compensated for by the nonlinear compensation circuit 104 and then supplied to an A/D (analog/digital) converter 106 and a clock recovery circuit 107 after the frequency characteristic thereof is compensated for by an equalizer 105. The clock recovery circuit 107 produces, based on the playback signal received from the equalizer 105, a clock signal synchronized with the playback signal.

The clock signal produced by the clock recovery circuit 107 is supplied as a sampling clock signal to the A/D converter 106. The A/D converter 106 samples the playback signal in synchronism with the sampling clock signal supplied thereto from the clock recovery circuit 107 to convert the playback signal into digital data. The digital data obtained by the A/D conversion of the A/D converter 106 are Viterbi decoded by a Viterbi decoder 108 and then modulated by and outputted from a demodulation circuit 109.

On the other hand, in the recording system (writing system), data (a digital input string) are modulated by a modulation circuit 110 and write compensated for by a write compensation circuit 111, and then they are supplied to the head section 102 through a recording driver 112. Then, the information is written (recorded) onto the recording medium 101 by the head section 102.

In the high-density recording and playback apparatus of the configuration described above, a head apparatus 100 is formed from the head section 102, preamplifier 103 and recording driver 112. The head apparatus according to the first embodiment, the head apparatus according to the modification to the first embodiment or the head apparatus according to the second embodiment described above is used as the head apparatus 100.

The head section 102 includes the MR head 31 and the TF head 32 shown in FIGS. 1 and 2 or the MR head 81 and the TF head 82 shown in FIG. 3. Further, the preamplifier 103 includes the first playback amplifier 11 and the second playback amplifier 21 shown in FIGS. 1 and 2 and the first playback amplifier 61 and the second playback amplifier 71 shown in FIG. 3.

Since the recording and playback apparatus uses the head apparatus according to the first embodiment, the head apparatus according to the modification to the first embodiment or the head apparatus according to the second embodiment described hereinabove in this manner, since the head apparatus are tough against disturbing noise and can improve the S/N ratio, even if the capacity of the disk type recording medium 101 increases and the data rate is raised in accordance with the increase of the capacity, the recording and playback apparatus can cope with this sufficiently.

Particularly, with the head apparatus according to the second embodiment, since the number of connection wiring lines between the COS IC 60 and the mother IC 70 can be minimized, when the COS technique wherein a playback amplifier (or a playback amplifier and a recording driver) is carried on a suspension together with a head section, there is no problem in wiring line processing at the head wiring line junction section interposed between the suspension side and the signal processing system side.

While preferred embodiments of the present invention have been described using specific terms, such description is for illustrative purposes only, and it is to be understood that changes and variations may be made without departing from the spirit or scope of the following claims.

What is claimed is:

1. A head apparatus, comprising:
   a support section for supporting a head section;
   a playback amplifier mounted on said support section for amplifying a playback signal outputted from said head section;
   a circuit section mounted on said support section for setting a bias current for said head section;
   a signal processing system provided outside said support section; and
   a transmission line for transmitting read data outputted from said playback amplifier having a first emitter follower out-put transistor to said signal processing system and transmitting serial data from said signal processing system having a second emitter follower out-put transistor to said circuit section.

2. A head apparatus according to claim 1, further comprising a recording driver mounted on said support section for supplying a recording current to said head section.

3. A head apparatus, comprising:
   a support section for supporting a head section;
   a playback amplifier mounted on said support section for amplifying a playback signal outputted from said head section;
   a circuit section mounted on said support section for setting a bias current for said head section;
   a signal processing system provided outside said support section; and
   a transmission line for transmitting read data outputted from said playback amplifier to said signal processing system and transmitting serial data from said signal processing system to said circuit section, wherein said transmission line includes a pair of signal lines for transmitting the read data outputted from said playback amplifier to said signal processing system, and said signal lines are used to transmit the serial data from said signal processing system to said circuit section.

4. A head apparatus according to claim 3, wherein the read data has a dc level different from that of the serial data.

5. A head apparatus according to claim 4, further comprising a level setting circuit provided for said signal processing system for setting the dc level of the serial data to a level different from the dc level of the read data.

6. A head apparatus according to claim 5, wherein said circuit section includes a discrimination circuit for comparing potentials of said signal lines with a predetermined reference level to discriminate the serial data.

7. A hard disk apparatus, comprising:
   a hard disk; and
   a head apparatus including a head section for recording and playing back information onto and from said hard disk;
   said head apparatus further including a support section for supporting said head section, a playback amplifier mounted on said support section for amplifying a playback signal outputted from said head section, a circuit section mounted on said support section for setting a bias current for said head section, a signal processing system provided outside said support section, and a transmission line for transmitting read data outputted from said playback amplifier having a first emitter follower out-put transistor to said signal processing system and transmitting serial data from said signal processing system having a second emitter follower out-put transistor to said circuit section.

8. A hard disk apparatus according to claim 7, wherein said head apparatus further includes a recording driver mounted on said support section for supplying a recording current to said head section.

9. A hard disk apparatus, comprising:
   a hard disk; and
   a head apparatus including a head section for recording and playing back information onto and from said hard disk;
   said head apparatus further including a support section for supporting said head section, a playback amplifier mounted on said support section for amplifying a playback signal outputted from said head section, a circuit section mounted on said support section for setting a bias current for said head section, a signal processing system provided outside said support section, and a transmission line for transmitting read data outputted from said playback amplifier to said signal processing system and transmitting serial data from said signal processing system to said circuit section,
   wherein said transmission line includes a pair of signal lines for transmitting the read data outputted from said playback amplifier to said signal processing system, and said signal lines are used to transmit the serial data from said signal processing system to said circuit section.

10. A recording and playback apparatus, comprising:
    a head apparatus including a head section for recording and playing back information onto and from a recording medium;
    said head apparatus further including a support section for supporting said head section, a playback amplifier mounted on said support section for amplifying a playback signal outputted from said head section, a circuit section mounted on said support section for setting a bias current for said head section, a signal processing system provided outside said support section, and a transmission line for transmitting read data outputted from said playback amplifier having a first emitter follower out-put transistor to said signal processing system and transmitting serial data from said signal processing system having a second emitter follower out-put transistor to said circuit section.

11. A recording and playback apparatus according to claim 10, wherein said head apparatus further includes a recording driver mounted on said support section for supplying a recording current to said head section.

12. A recording and playback apparatus, comprising:
    a head apparatus including a head section for recording and playing back information onto and from a recording medium;
    said head apparatus further including a support section for supporting said head section, a playback amplifier mounted on said support section for amplifying a playback signal outputted from said head section, a circuit section mounted on said support section for setting a bias current for said head section, a signal processing system provided outside said support section, and a transmission line for transmitting read data outputted from said playback amplifier to said signal processing system and transmitting serial data from said signal processing system to said circuit section, wherein said transmission line includes a pair of signal lines for transmitting the read data outputted from said playback amplifier to said signal processing system, and said signal lines are used to transmit the serial data from said signal processing system to said circuit section.

* * * * *